United States Patent [19]

Baker

[11] Patent Number: 5,082,015

[45] Date of Patent: Jan. 21, 1992

[54] SEQUENCING VALVE POSITION INDICATOR

[76] Inventor: Joseph R. Baker, 73 Fairview East, Tequesta, Fla. 33469

[21] Appl. No.: 723,821

[22] Filed: Jul. 1, 1991

[51] Int. Cl.⁵ ............................................. F16K 11/02
[52] U.S. Cl. .................... 137/119; 137/624.18; 137/555
[58] Field of Search .................... 137/119, 624.18, 555, 137/553; 116/277

[56] References Cited

U.S. PATENT DOCUMENTS

| | | | |
|---|---|---|---|
| 3,439,706 | 4/1969 | Barrett | 137/554 |
| 3,924,652 | 12/1975 | Kah | 137/119 |
| 4,109,670 | 8/1978 | Slagel | 137/119 |
| 4,492,247 | 1/1985 | Lockwood | 137/119 |
| 4,671,486 | 6/1987 | Giannini | 251/65 |
| 4,796,657 | 1/1989 | Baker | 137/119 |

Primary Examiner—Alan Cohan
Attorney, Agent, or Firm—Alvin S. Blum

[57] ABSTRACT

This invention relates to sequencing valves for distributing fluid from an inlet selectively to one of a plurality of outlets in response to variation in the pressure of the source fluid. The improvement provides a visual indication of which particular outlet is connected to the inlet at any particular time. The invention may be practiced as a retrofit kit for installation on conventional valves or a new valve may be provided with the position indicating features of the invention.

12 Claims, 2 Drawing Sheets

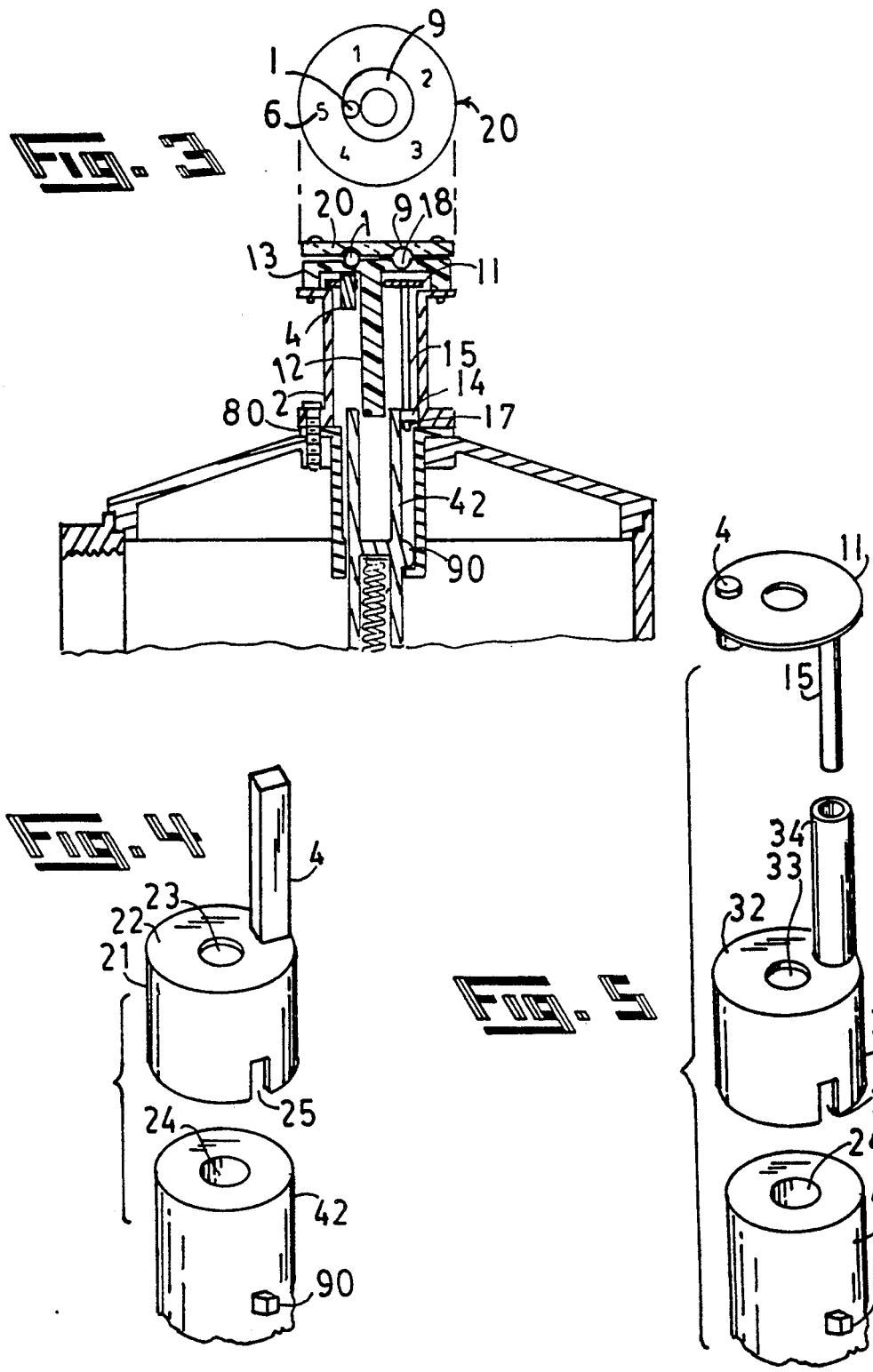

SEQUENCING VALVE POSITION INDICATOR

BACKGROUND OF THE INVENTION

This invention relates generally to sequencing valves for sequentially selectively coupling one of a plurality of outlet conduits with a single supply conduit that sequentially actuate in response to a change in supply fluid pressure, and more particularly to an indicating means for providing visual indication of which particular outlet conduit is connected to the supply conduit at any particular time.

Valves of this general type that provide no visible indication are described by the following U.S. Patents: U.S. Pat. No. 4,125,124 issued 11/78 to Kah; U.S. Pat. No. 4,083,290 issued 4/78 to Andres; U.S. Pat. No. 4,178,963 issued 12/79 to Riefler; U.S. Pat. No. 4,195,665 issued 4/80 to Nolan and U.S. Pat. No. 3,924,652 issued 12/75 to Kah. U.S. Pat. No. 4,796,657 issued 1/89 to Baker, the applicant, teaches a manual selecting and locking control for these valves, but also without external means for indicating which outlet has been selected.

U.S. Pat. No. 4,492,247 issued 1/85 to Lockwood does teach a sequencing valve with an external indicator in the form of a rotatable external disc 16 mechanically coupled to the internal rotary shaft of the valve. Because a valve of this type is exposed to all manner of dirt and debris, the disc may be prevented from turning by trapped foreign matter. Since the disc is mechanically coupled to the operating shaft of the valve, this will in turn prevent the valve from operating. Transparent covers for the valve that would simply allow view of the inner shaft position are not feasible because the inner surface of the cover is promptly obscured by impurities in the irrigation water.

SUMMARY OF THE INVENTION

It is accordingly an object of the invention to provide externally visible means for indicating which particular outlet of a multi-outlet sequencing valve is connected to the inlet. It is a further object that the indicating means is not obscured by contamination or discoloration from contaminants in the water passing through the valve. It is yet another object of the invention that the indicating means have no externally moving parts and no direct mechanical linkage to the internal valve mechanism so that external conditions cannot interrupt the operation of the indicator and cannot adversely affect the internal valve operating mechanism. The indicating means of the invention includes an internal magnet mechanically coupled to the internal rotary shaft of the valve. A magnetically actuated ball located external to the valve housing in a circular track concentric with the shaft is located close enough to the internal magnet that it rotates in conjunction with the magnet. A transparent cover protects the ball, and indicia along the ball track or the cover indicate the particular outlet position relative to the shaft so that the operator looking through the cover can see by the ball position which outlet is connected.

These and other objects, advantages and features of the invention will become more apparent when the detailed description is studied in conjunction with the accompanying drawings.

BRIEF DESCRIPTION OF THE DRAWINGS

FIG. 3 is a partial cross sectional view of an alternative embodiment of the valve of the invention.

FIG. 4 is a perspective view of a magnet attachment for retrofitting a valve to the structure of FIG. 1.

FIG. 5 is a perspective view of a magnet attachment for retrofitting a valve to the structure of FIG. 3.

DETAILED DESCRIPTION OF PREFERRED EMBODIMENTS

Figure 1:
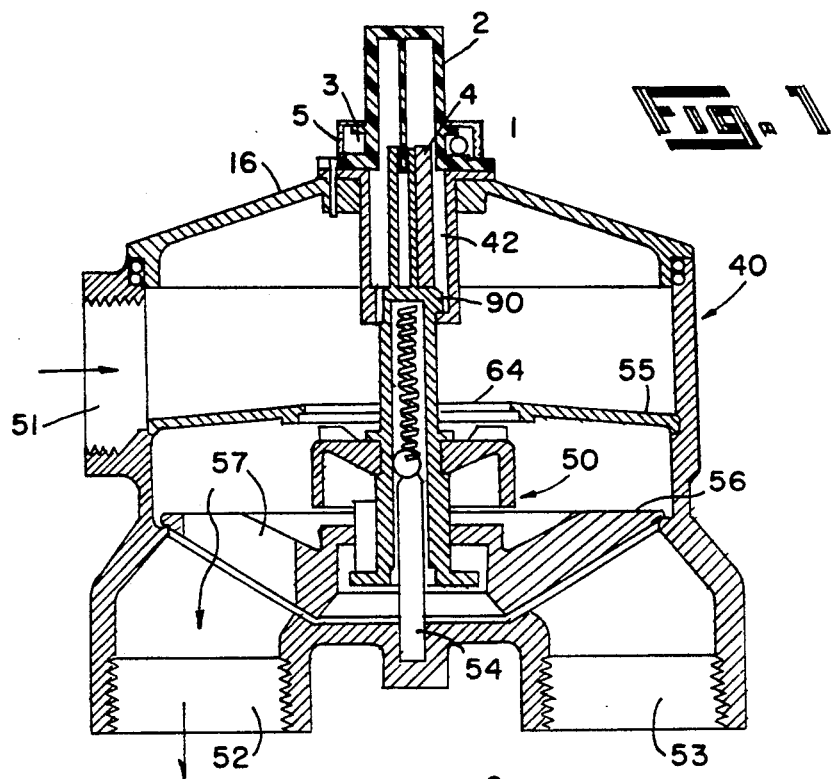
FIG. 1 is a cross sectional view of a valve of the invention in water pressure on condition.
Figure 1A:
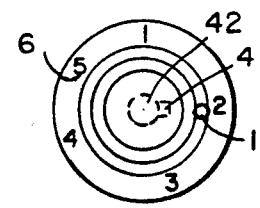
FIG. 1A is a projected top view of the indicator of FIG. 1.
Figure 2:
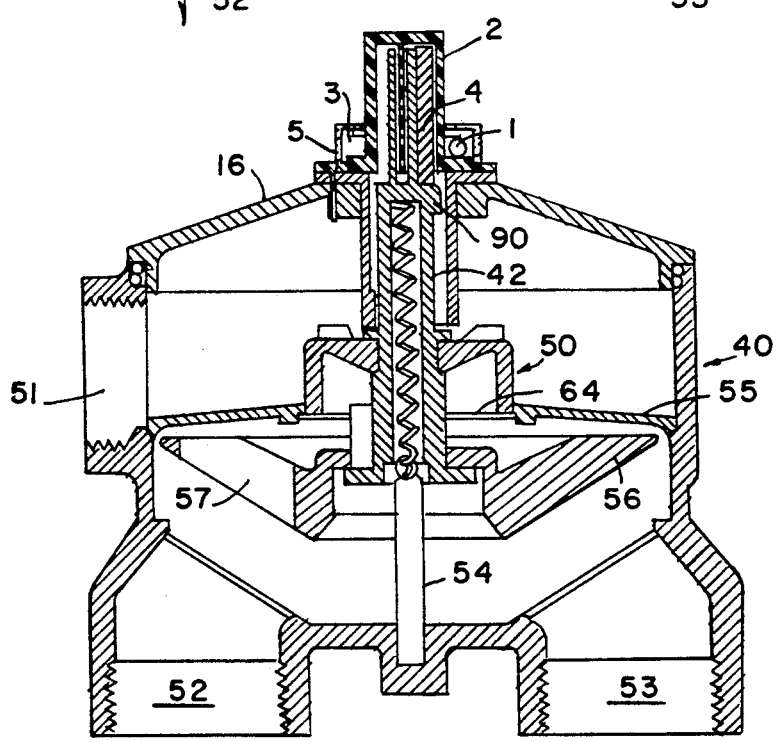
FIG. 2 is a cross sectional view of the valve of FIG. 1 in the water pressure off condition.

Referring now first to FIGS. 1 and 2 showing cross sectional views of a sequencing valve 40 of the invention with water pressure on (FIG. 1) and water pressure off (FIG. 2). A single water inlet 51 feeds water into a housing 16 that communicates with a plurality of outlet ports 52, 53 arranged in a circle about the central vertical axis of the valve. A piston assembly 50 with vertical stem 42 rides up and down on rod 54. It is forced upward into the position of FIG. 2 by the force of spring 70 closing aperture 64 in member 55 and elevating sealing element 56. Water pressure at inlet 51 forces assembly 56 downward to the position shown in FIG. 1 in which sealing assembly 56 seals all outlets except one through passage 57, in the example shown, outlet 52 is now open and all other outlets are sealed. Each up and down cycle of assembly 50 generated by a water pressure on and off cycle causes cam follower lug 90 on rotary shaft 42 to follow a pattern on camming member 80 that causes assembly 50 to rotate about its vertical axis so that passage 57 in outlet sealing element 56 is rotated to the next outlet in the sequence. An elongate, vertically disposed permanent magnet 4 is attached to the shaft 42 and extends radially therefrom. As the valve sequences from one outlet to the next, the magnet rotates correspondingly about the central axis with shaft 42 so that the rotary position of the magnet reflects the connecting position of the valve.

A cap 2 sealingly covers the top opening in valve housing 16. It is provided with a circumferential ball race 3 for a magnetic ball 1. A transparent ball cover 5 seals the ball race space and retains the ball 1 therein while providing a view of the position of the ball. The wall between magnet 4 and ball 1 is of a thickness and composition such that the ball is always adjacent the magnet during up and down and rotary motion of the magnet. Consequently, the position of the ball gives a visual indication of the operating position of the valve. Numbered indicia 6 are provided to indicate the particular outlet connected in the sequence. Because the annular space enclosing the ball 1 is sealed from the water in the valve and the outside environment, the indicator will remain visible and only an occasional external wiping may be required for maintenance. Debris cannot interfere with ball rotation and, since there is only magnetic coupling to shaft 42, conditions of the indicator cannot affect operation of the valve.

Referring now to FIG. 3, an alternative embodiment of the invention is shown in a cross sectional view of the upper portion of a sequencing valve of the invention. A cap 2 sealingly covers the top opening in valve housing 16. Rotatably supported on the upper shoulder of cap 2 is washer 11 that rotates about fixed rod 12. Rod 12 extends down from top cover 13 to stabilize the vertical motion of rotary shaft 42 which operates with cam follower lug 90 on camming member 80 as described for FIGS. 1 and 2. A radial projection 14 on shaft 42 has a vertical hole 17 therethrough adapted to receive rod 15 affixed to washer 11.

As shaft 42 moves up and down and rotates, washer 11 will rotate correspondingly and the lost motion connection of rod 15 and projection 14 prevents radial forces being exerted on washer 11. Affixed to washer 11 is a permanent magnet 4 whose top surface is in close proximity to top cover 13 that seals the water within the valve housing. An annular groove 18 in top cover 13 cooperates with a corresponding annular groove 9 in transparent lid 20 to form a circumferential ball race for free rolling magnetic ball 1 that will always be positioned directly over magnet 4 by magnetic attraction. As the valve sequences and shaft 42 rotates, the ball 1 will follow it and provide a visual indication of valve position. The ball is sealed away from contamination, the viewing window is free from contamination from water within the valve and there are no mechanical linkages between the indicator ball and the internal elements of the valve to interfere with its operation. At the upper end of FIG. 3 is projected a top view of the indicator for clarity of illustration.

The invention may be retrofitted onto a convention valve by installing a magnet assembly that rotates with the rotary valve shaft as shown in FIGS. 4 and 5.

Referring now first to FIG. 4, the rotary shaft 42 with cam follower 90 is shown broken away from the rest of the valve for clarity of illustration. A thin-walled sleeve 21 has a top 22 with an aperture 23 matching hole 24 in shaft 42. This is arranged to fit over shaft 42 with slot 25 receiving cam follower 90 so that shaft 42 operates as usual and sleeve 21 will rotate in conjunction with it. Vertical permanent magnet 4 is affixed to the top 22 of sleeve 21 and thereby provides the indicator operation as described above for FIGS. 1 and 2.

Referring now to FIG. 5, the washer 11 with rod 15 and magnet 4 are as described above for the valve of FIG. 3. A thin-walled sleeve 31 with top 32 having hole 33 slides over shaft 42 and slot 35 receives cam follower 90 so that shaft 42 operates as usual and sleeve 21 will rotate in conjunction with it. A tube 34 affixed to the top 32 of sleeve 31 receives rod 15 and causes washer 11 to rotate with shaft 42 while the rod 15 and tube 34 provide the lost motion connection so that the washer 11 and magnet 4 rotate without vertical forces. The other elements are as shown in FIG. 3.

The instant invention may be used effectively in conjunction with Applicant's earlier invention disclosed in U.S. Pat. No. 4,796,657 that teaches manual control of valve operation so that the operator can see which outlet is connected as the valve is manually operated.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. In an automatic sprinkling valve having a housing, an inlet and a plurality of outlets in said housing, a movable valve member within said housing constructed to connect the inlet sequentially with each of the outlets, a mechanism responsive to sequential increases and decreases in pressure at the inlet for moving said valve member in a combined rotary motion about a central axis and reciprocating motion to connect the inlet sequentially with each of said outlets, the improvement comprising:
    (a) an enclosure attached to the exterior of said housing, said enclosure being at least partially transparent for viewing the contents thereof and fluidically isolated from the interior of said housing;
    (b) a first magnetic member contained within said enclosure, said first member arranged to rotate about said central axis;
    (c) a second magnetic member, said second magnetic member contained within said housing and arranged to rotate about said central axis in conjunction with the rotary motion of said valve member, said second magnetic member and said first magnetic member being arranged sufficiently close together that said first magnetic member is attracted to said second magnetic member through the wall of said housing and rotates in conjunction with said second magnetic member and said valve member so that the position of the first magnetic member provides a visual indication of the particular outlet that is connected to the inlet; and
    (d) at least one of said magnetic members is a permanent magnet.

2. The valve according to claim 1, further comprising externally visible indicia corresponding to the angular position of each said outlet, said indicia arranged adjacent to the rotational path of said first magnetic member.

3. The valve according to claim 1, in which the enclosure provides an annular space concentric with said central axis and said first magnetic member is a sphere.

4. The valve according to claim 3, in which said sphere is a permanent magnet.

5. The valve according to claim 3, in which said second magnetic member is elongate, having a long axis arranged parallel to said central axis.

6. The valve according to claim 1, in which said second magnetic member is connected to said valve member by a lost motion mechanism, whereby said second magnetic member rotates in a vertically fixed circular path.

7. In an automatic sprinkling valve having a housing, an inlet and a plurality of outlets in said housing, a movable valve member within said housing constructed to connect the inlet sequentially with each of the outlets, a mechanism responsive to sequential increases and decreases in pressure at the inlet for moving said valve member in a combined rotary motion about a central axis and reciprocating motion to connect the inlet sequentially with each of said outlets, the improvement including an attachment for said valve, the attachment comprising:
    (a) an enclosure attached to the exterior of said housing, said enclosure being at least partially transparent for viewing the contents thereof and fluidically isolated from the interior of said housing;

(b) a first magnetic member contained within said enclosure, said first member arranged to rotate about said central axis;

(c) a second magnetic member, said second magnetic member contained within said housing and arranged to rotate about said central axis in conjunction with the rotary motion of said valve member, said second magnetic member and said first magnetic member being arranged sufficiently close together that said first magnetic member is attracted to said second magnetic member through the wall of said housing and rotates in conjunction with said second magnetic member and said valve member so that the position of the first magnetic member provides a visual indication of the particular outlet that is connected to the inlet; and (d) at least one of said magnetic members is a permanent magnet.

8. The attachment according to claim 7, further comprising externally visible indicia corresponding to the angular position of each said outlet, said indicia arranged adjacent to the rotational path of said first magnetic member.

9. The attachment according to claim 7, in which the enclosure provides an annular space concentric with said central axis and said first magnetic member is a sphere.

10. The attachment according to claim 9, in which said sphere is a permanent magnet.

11. The attachment according to claim 9, in which said second magnetic member is elongate, having a long axis arranged parallel to said central axis.

12. The attachment according to claim 7, in which said second magnetic member is connected to said valve member by a lost motion mechanism, whereby said second magnetic member rotates in a vertically fixed circular path.

* * * * *